Oct. 21, 1941.   K. J. JACOBI   2,260,250
TREATMENT OF NATURAL SODIUM MAGNESIUM BRINES
Filed May 18, 1939
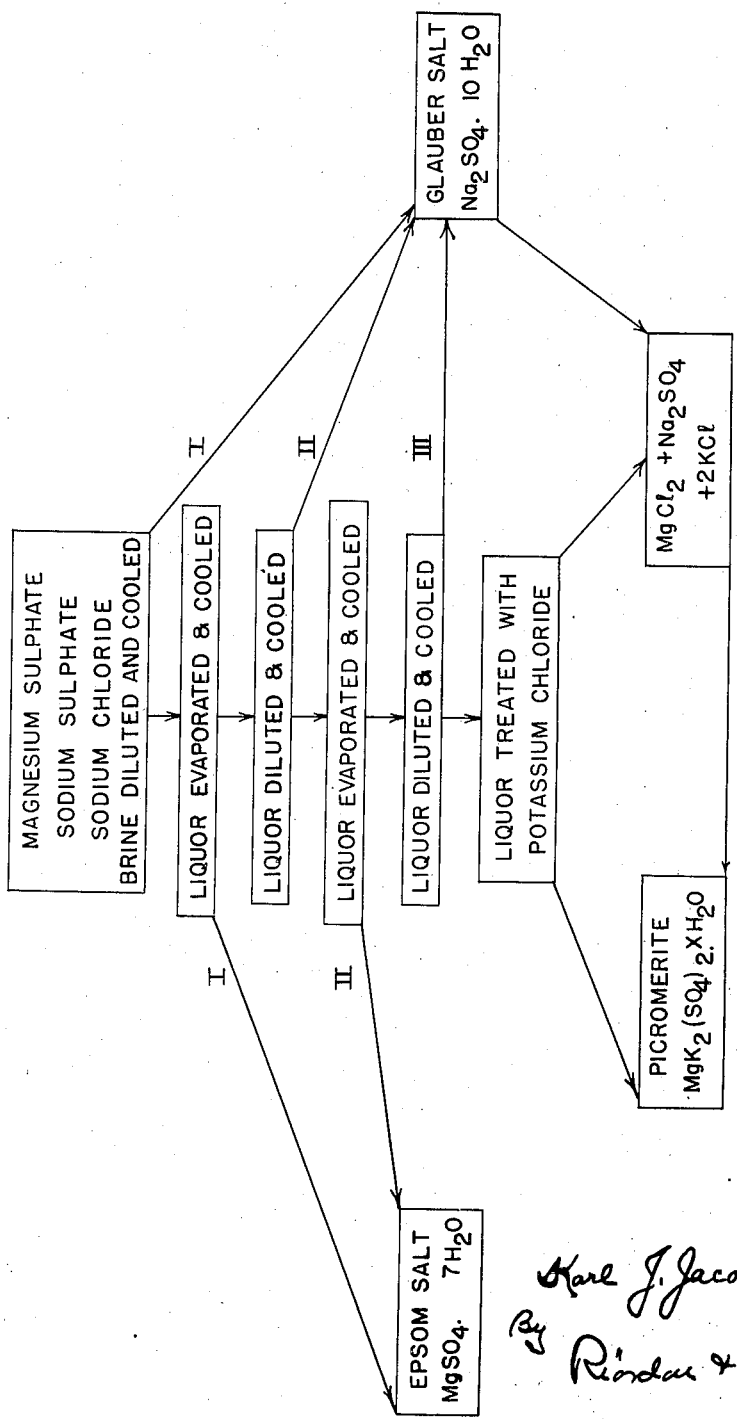

Patented Oct. 21, 1941

2,260,250

UNITED STATES PATENT OFFICE 2,260,250

TREATMENT OF NATURAL SODIUM MAGNESIUM BRINES

Karl J. Jacobi, Carlsbad, N. Mex., assignor to United States Potash Company, Carlsbad, N. Mex., a corporation of New Mexico Application May 18, 1939, Serial No. 274,458

3 Claims. (Cl. 23—117)

This invention relates to the refining of brines containing magnesium salts for the purpose of recovering the magnesium in the form of one or another magnesium salt. There are certain brines occurring naturally and being principally the sulphates of magnesium and sodium with minor percentages of sodium chloride. Such brines offer considerable of a problem in their purification since it is difficult to separate one salt from another with any degree of completeness. There are certain natural brines of this type in the vinicity of Carlsbad, New Mexico, which are available through wells drilled to tap these underground waters. It is proposed by treating such natural brines as described hereinafter to produce magnesium salts in a form available for use in fertilizers and other technical and industrial operations.

Broadly speaking the process involves essentially a change in the concentration of the brine such that subsequent cooling will facilitate the crystallization of sodium sulphate (Glauber salt) $Na_2SO_4.10H_2O$ while at the same time any magnesium sulphate (Epsom salt) $MgSO_4.7H_2O$ is prevented from crystallization. This operation is followed by concentration of the residual brine to a point where cooling will then separate crystals of Epsom salt. In this way the ratio between these two salts is restored substantially to that in the original brine. The above cycle may then be repeated until the concentration of impurities is so high as to interfere with the grade of the next crop of $MgSO_4$, if produced. The final brine is then treated with potassium chloride with or without added sodium sulphate and thus there is separated by crystallization a double sulphate of magnesium and potassium of good quality.

It is an object of my invention to effect a high degree of separation between the sulphates of sodium and magnesium with great economy. It is a further object of my invention to produce the salts of these metals in forms most acceptable and useful for technical or commercial purposes.

The essential features of the invention have been illustrated by way of example in the attached diagram showing successive operations or steps in the process.

An example of my invention is given as applied to a typical natural brine from the Carlsbad, New Mexico, area. Such a brine contains approximately 19.50% magnesium sulphate; 11.25% sodium sulphate and 3.10% sodium chloride. For all practical purposes this brine is saturated at about 67° Fahrenheit so that, if the temperature is lowered, crystals begin to form. While these crystals are largely made up of sodium sulphate in the form of Glauber salt ($Na_2SO_4.10H_2O$) magnesium sulphate soon begins to crystallize in the form of Epsom salt ($MgSO_4.7H_2O$) and thus cooling alone is not sufficient for the separation of the two salts.

If, however, enough water is added to the brine to supply the ten molecules required for the production of Glauber salt then moderate cooling would cause its crystallization without crystallizing out magnesium sulphate and thus a very pure sodium sulphate is obtainable. The amount of water to be added should be sufficient to provide for the indicated hydration in the sodium sulphate with an added excess as a margin of safety. The temperature drop need not be great and cooling to 41°-44° Fahrenheit will be sufficient to effect material separation of the sodium sulphate without crystallizing magnesium sulphate. This first yield should be no less than 55% of the total sodium sulphate contained in the brine.

Any impurity in such Glauber salt can be attributed to adhering residual brine. For this reason it is most desirable to separate the crystals from this brine as far as possible by any convenient means such for example as a centrifuge.

In adding the water to the brine before cooling, a small excess over the calculated amount is used not only as a margin of safety but also to offset the possible increase in the sodium sulphate content or an unintentional drop in temperature beyond the point found most suitable.

The second step in the process consists in concentrating the residual brine by evaporation to a point which will produce a crystallization of a substantial part of the magnesium sulphate leaving a remainder such that it bears approximately the same ratio to the residual sodium sulphate as existed in the percentages in the original brine. In practice this means that the evaporation is continued until the combined crystals and liquid weigh about 67% of the weight of the brine being evaporated. However, some variation is permissible without affecting the final results too much.

Such concentrated or evaporated brine will have perhaps 29% content of magnesium sulphate before crystallization. The evaporated brine is now cooled to approximately 62° F. at which point at least 65% of the magnesium sulphate contained in the brine has crystallized.

This magnesium sulphate in the form of Epsom salt is recovered by conventional means and purified by centrifuge or otherwise.

Separation as above indicated successively for the two sulphates should leave a brine in which the ratio of the residues in the brine is the same as that in the initial brine. In other words, after the successive separation of the two salts, the brine will still be found to contain a ratio of magnesium sulphate to sodium sulphate which is approximately 19.5 to 11.25.

It may be found desirable to separate the magnesium sulphate in two stages due to the large volume of salt as compared to the small amount of brine.

The brine remaining from this second crystallizing operation may then be used for the successive removal of another crop each of sodium sulphate and magnesium sulphate in the manner above described. To effect this, the residual brine is now diluted with water exactly as in the first step, the amount being calculated on the expected amount of Glauber salt that may be recovered. This may be between 27 and 30% of the total originally present. The cooling to 41°–44° F., will effect separation of the Glauber salt from the brine.

The brine is then concentrated by evaporation until the magnesium sulphate reaches a concentration of perhaps 25%. Cooling to 62° F., will produce a second crop of Epsom salt crystals well over 20% of the total content of the brine.

At this point the recovery of the two sulphates ought to total 88% of the amount present of each. A third dilution step followed by cooling to 45° F., will produce about 3.5% to 4% more Glauber salt which will bring the total recovery of this salt to perhaps 92%. When this has been accomplished the liquor from this crop is so concentrated with respect to the sodium chloride originally present in the brine that it is not possible to evaporate further and produce a satisfactory crop of Epsom salt of sufficient purity. The magnesium present, however, may be readily separated in the form of the double sulphate of magnesium and potassium.

To carry out this purpose potassium chloride is added to the final liquor. The mixture is heated to the boiling point and then immediately cooled to room temperature. This is sufficient to produce the double salt which crystallizes out with water but without much contamination. This brings the recovery of magnesium to as much as 90% of that originally present and makes the recovery comparable with that of the Glauber salt.

The reaction is indicated by the following equation:

$$2MgSO_4 + 2KCl = MgK_2(SO_4)_2 + MgCl_2$$

Since the double salt is a most desirable form for the product the complete recovery of all of the magnesium present can be attained in this form. To do this it has been found that by adding sodium sulphate to the liquor obtained by the above reaction together with an equivalent amount of potassium chloride, a material increase in the yield of the double salt is realized. Further if the sodium sulphate is anhydrous instead of the hydrous Glauber salt, this yield is almost theoretical. The following reaction will illustrate what takes place:

$$MgCl_2 + 2KCl + 2Na_2SO_4 = MgK_2(SO_4)_2 + 4NaCl$$

We have virtually two molecules $MgSO_4$ in the brine for every molecule of sodium sulphate and if we use the salts in the same ratio that is, two molecules magnesium sulphate for the first reaction and one molecule of sodium sulphate for the second reaction we have an excellent product. It appears to depend on the ratio of sodium chloride to magnesium chloride in the solution whether or not the pure magnesium-potassium double salt (picromerite) is formed.

This picromerite can also be made directly from the brine and in larger quantities than before by taking into account the presence of sodium sulphate and using the additional potassium chloride required for it. Several experiments verified this, all being very uniform. In all cases the recovery of $K_2O$ is less than when using pure Epsom salt only. On the other hand nearly 100% of the available magnesium sulphate was recovered and this may be the more important result to be sought.

From the above it will be evident that the production of the magnesium-potassium double salt also results under this invention from the direct reaction of potassium chloride upon magnesium sulphate present in the original brine. This is exemplified by adding potassium chloride to the brine at ordinary temperatures (75°–80° F.) resulting in the recovery of a greater amount of the double salt. If the mixture is heated to evaporate some of the water present in the brine, then the recovery of the double salt is increased by possibly as much as 10%. The reaction is indicated as follows:

$$4MgSO_4 + 2Na_2SO_4 + 6KCl = 3MgK_2(SO_4)_2 + 4NaCl + MgCl_2$$

The following is a specific example of the process as carried out with the brine of the analysis indicated.

2000 gr. Brine:

| | Per cent |
|---|---|
| $MgSO_4$ | 19.35 |
| $Na_2SO_4$ | 11.25 |
| NaCl | 3.10 |
| Water | 66.30 |

200 cc. water added and cooled to 45° F.;
Glauber salt (I) removed, 322.1 gr. (equivalent to 142 gr. $Na_2SO_4$).
1805 gr. residual liquor evaporated to 1270 gr. and cooled to 62° F.;
Epsom salt (I) recovered, 526.1 gr. (equivalent to 256.7 gr. $MgSO_4$).
580 gr. residual liquor diluted with 95 cc. water and cooled to 45° F.;
Glauber salt (II) removed, 110.2 gr.
541 gr. residual liquor evaporated to 360 gr. and cooled to 62° F.;
Epsom salt (II) recovered, 133.8 gr.
196 gr. residual liquor diluted with 30 cc. water and cooled to 45° F.;
Glauber salt (III) removed, 29 gr.
189 gr. residual liquor treated with 14.8 gr. KCl, heated to boiling and cooled to room temperature;
Picromerite recovered, 23.3 gr.

Estimated loss in separation of salts from mother liquor and avoidable in full plant operation:

| | Grams |
|---|---|
| Sodium sulphate | 23 |
| Magnesium sulphate | 42 |

Roughly speaking this affords a recovery of over 90% of each of the sulphates originally present in the brine.

The above description given of this invention is merly illustrative and changes and modifications in minor details are within the scope of the invention as defined in the following claims.

What I claim is:

1. The process of recovering magnesium salts from naturally occurring brines substantially saturated with the sulphates of magnesium and sodium which consists in first diluting the brine, cooling the brine to crystallize Glauber salt, separating and evaporating the residual brine, cooling the same to crystallize Epsom salt, separating the brine, repeating the above steps to recover successively a second crystalline crop each of Glauber salt and Epsom salt, then recovering a third crystalline crop of Glauber salt and finally removing the magnesium from the resultant brine as magnesium-potassium sulphate by the addition of potassium chloride.

2. The process of recovering magnesium salts from naturally occurring brines substantially saturated with the sulphates of magnesium and sodium which consists in first diluting the brine, cooling the brine to crystallize Glauber salt, separating and evaporating the residual brine, cooling the same to crystallize Epsom salt, separating the brine, repeating the above steps to recover successively further crystalline crops each of Glauber salt and Epsom salt, and finally removing the magnesium from the resultant brine as magnesium-potassium sulphate by reaction with potassium chloride in the presence of sodium sulphate.

3. The process of recovering magnesium salts from naturally occurring brines substantially saturated with the sulphates of magnesium and sodium which consists in adding sufficient water to prevent crystallization of magnesium sulphate, cooling the brine and separating the Glauber salt, evaporating and cooling the residual brine to crystallize Epsom salt, adding water to the remaining brine, cooling to remove a second crystalline crop of Glauber salt, evaporating and cooling the remaining brine to recover a second crystalline crop of Epsom salt, repeating the first step of diluting and cooling the brine for the further removal of Glauber salt and finally removing the magnesium from the resultant brine as the double sulphate of magnesium and potassium by the addition of a potassium salt.

KARL J. JACOBI.